(12) United States Patent
Bui et al.

(10) Patent No.: US 7,813,077 B2
(45) Date of Patent: Oct. 12, 2010

(54) APPARATUS, SYSTEM, AND METHOD FOR DETECTING A PERIODIC SEQUENCE OF SERVO SIGNALS

(75) Inventors: Nhan Xuan Bui, Tucson, AZ (US); Roy Daron Cideciyan, Rueschlikon (CH); Robert Allen Hutchins, Tucson, AZ (US); Thomas Mittelholzer, Zurich (CH); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/469,133

(22) Filed: Aug. 31, 2006

(65) Prior Publication Data

US 2008/0055759 A1    Mar. 6, 2008

(51) Int. Cl.
*G11B 5/596*  (2006.01)
(52) U.S. Cl. .................................. 360/78.14
(58) Field of Classification Search .................. 369/39; 360/78.14, 77.06, 61, 77.08, 77.12
See application file for complete search history.

(56) References Cited

U.S. PATENT DOCUMENTS

| | | | |
|---|---|---|---|
| 4,933,786 A | 6/1990 | Wilson | 360/78.14 |
| 5,724,204 A | 3/1998 | Shinohara et al. | 360/77.06 |
| 5,754,354 A | 5/1998 | Tomita et al. | 360/61 |
| 5,966,264 A | 10/1999 | Belser et al. | 360/77.08 |
| 6,239,939 B1 | 5/2001 | Bui et al. | 360/77.12 |
| 6,985,543 B1 | 1/2006 | Sutardja | 375/345 |
| 7,211,791 B2 * | 5/2007 | Miller et al. | 250/286 |
| 2002/0150179 A1 | 10/2002 | Leis et al. | 375/340 |
| 2005/0168858 A1 | 8/2005 | Lee et al. | 360/31 |

* cited by examiner

*Primary Examiner*—Allen T Cao
(74) *Attorney, Agent, or Firm*—Kunzler Needham Massey & Thorpe (57) ABSTRACT

An apparatus, system, and method are disclosed for detecting a periodic sequence. A value detector module detects a plurality of values of a periodic sequence. In one embodiment, a transformation module transforms the plurality of values into transformed values. A confinement module confines the values to a limited set of confined values. A correlation module correlates the confined values with a plurality of instances of the periodic sequence. In addition, a selection module selects an instance of the periodic sequence with the highest correlation to the confined values as an observed periodic sequence.

8 Claims, 6 Drawing Sheets

FIG. 6

APPARATUS, SYSTEM, AND METHOD FOR DETECTING A PERIODIC SEQUENCE OF SERVO SIGNALS

BACKGROUND OF THE INVENTION

1. Field of the Invention

This invention relates to detecting information and more particularly relates to detecting a periodic sequence.

2. Description of the Related Art

In magnetic tape drives, periodic sequences are used to track spatial coordinates such as the lateral and longitudinal position on tape. These spatial coordinates are used to adjust the tape servo head to nominal positions on tape or to adjust the tape velocity to a specified target value. In a similar manner, the physical location on tape can be encoded into the periodic sequence allowing the tape system to precisely position the tape to a target location. A tape drive servo system may track the position of the head and tape by decoding the periodic sequence for one or more instances of the periodic sequence as is well known to those skilled in the art.

The periodic sequence may comprise a plurality of values. The values may be configured as groups of binary data values. The values may repeat every specified number of values. For example, a periodic sequence may include the values '1,' '2,' and '3' and repeat every four values such as '1 2 3 3 1 2 3 3.'

The periodic sequence may also be recorded on a storage medium such as magnetic videotape, magnetic hard disk, an optical storage medium, and the like. The periodic sequence may indicate a specified position for encoded information. For example, the periodic sequence may define a position of data encoded on the magnetic data tape. A read channel may employ the position data from the periodic sequence to identify and recover data on the magnetic data tape.

Unfortunately, the periodic sequence may become corrupted. For example, the periodic sequence may be generated with one or more erroneous values. Alternatively, the periodic sequence may be corrupted when stored on the storage medium and/or when read from the storage medium.

In the past periodic sequence values have been correlated with one or more instances of the periodic sequence to determine an observed periodic sequence instance. Unfortunately, correlation may be insufficiently robust to recover the periodic sequence when multiple errors are present and/or when only a small sample of the periodic sequence values is available.

From the foregoing discussion, it should be apparent that a need exists for an apparatus, system, and method that robustly detects a periodic sequence. Beneficially, such an apparatus, system, and method would improve the recovery of information encoded in the periodic sequence.

SUMMARY OF THE INVENTION

The present invention has been developed in response to the present state of the art, and in particular, in response to the problems and needs in the art that have not yet been fully solved by currently available periodic sequence detection methods. Accordingly, the present invention has been developed to provide an apparatus, system, and method for detecting a periodic sequence that overcome many or all of the above-discussed shortcomings in the art.

The apparatus to detect a periodic sequence is provided with a plurality of modules configured to functionally execute the steps of detecting values of a periodic sequence, confining the values to a limited set of confined values, correlating the confined values, and selecting an observed periodic sequence. These modules in the described embodiments include a value detector module, a confinement module, a correlation module, and a selection module. In addition, the apparatus may include a transformation module.

The value detector module detects a plurality of values of a periodic sequence. The periodic sequence may encode information such as spatial coordinates, or the like. In one embodiment, the values comprise counts of binary data.

In one embodiment, the transformation module transforms the plurality of values into transformed values. The transformed values may be configured to simplify the correction of the periodic sequence. The transformation module may transform the values by employing a mathematical equation.

The confinement module confines the plurality of values and/or transformed values to a limited set of confined values. In one embodiment, the confinement module may confine the values to two confined values. Alternatively, the confinement module may confine the values to three values.

The correlation module correlates the confined values with a plurality of instances of the periodic sequence. In one embodiment, the correlation module calculates a plurality of correlation values using a correlation equation comprising the confined values and periodic sequence instances. In a certain embodiment, the confined values and the periodic sequences are organized as arrays of values.

The selection module selects an instance of the periodic sequence with the highest correlation to the confined values as an observed periodic sequence. In one embodiment, the selected observed periodic sequence yields the largest correlation value from the correlation equation. The apparatus selects the observed periodic sequence by confining the detected values to improve the correlation of the detected values to the periodic sequence.

A system of the present invention is also presented to detect a periodic sequence. The system may be embodied in a storage device such as a magnetic tape drive. In particular, the system, in one embodiment, includes a storage medium, a read channel, and a sequence detector.

The storage medium has periodic sequences written to it by the manufacturer of the medium. The periodic sequence may be configured as encoded timing information. Alternatively, the periodic sequence may be configured as encoded position information. In one embodiment, the storage medium is magnetic tape.

The read channel reads the periodic sequence from the storage medium. In one embodiment, the read channel reads the periodic sequence as a plurality of binary values. The binary values may be configured as changes in magnetic polarity.

The sequence detector includes a value detector module, a transformation module, a confinement module, a correlation module, and a selection module. The value detector module detects a plurality of values from the read periodic sequence. The transformation module transforms the plurality of values into transformed values. The confinement module confines the transformed values to a limited set of confined values. The correlation module correlates the confined values with a plurality of instances of the periodic sequence. In addition, the selection module selects an instance of the periodic sequence with the highest correlation to the confined values as an observed periodic sequence. The system detects the observed periodic sequence through transforming, confining, and correlating the detected values of the periodic sequence.

A method of the present invention is also presented for detecting a periodic sequence. The method in the disclosed embodiments substantially includes the steps to carry out the functions presented above with respect to the operation of the described apparatus and system. In one embodiment, the method includes detecting values of a periodic sequence, confining the values to a limited set of confined values, correlating the confined values, and selecting an observed periodic sequence. The method may also include transforming the values.

A value detector module detects a plurality of values of a periodic sequence. In one embodiment, a transformation module transforms the plurality of values into transformed values. A confinement module confines the values to a limited set of confined values. A correlation module correlates the confined values with a plurality of instances of the periodic sequence. In addition, a selection module selects an instance of the periodic sequence with the highest correlation to the confined values as an observed periodic sequence. The method detects the observed periodic sequence although the values of the periodic sequence may include errors.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention detects a periodic sequence from a plurality of values by confining the values to a limited set of confined values. In addition, the embodiment of the present invention may improve the detection of the periodic sequence when the values include one or more errors. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
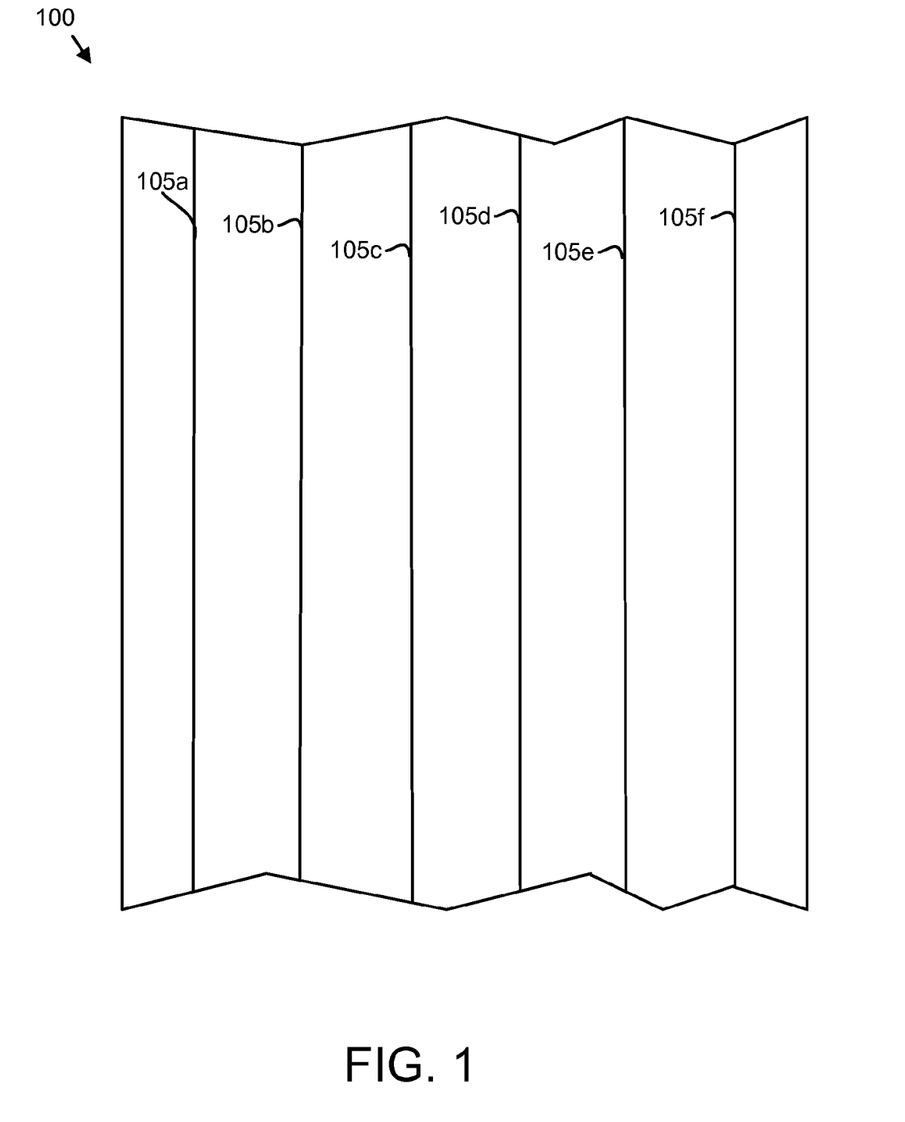
FIG. 1 is a drawing illustrating one embodiment of a magnetic tape segment in accordance with the present invention.

FIG. 1 is a drawing illustrating one embodiment of a magnetic tape segment 100 in accordance with the present invention. For simplicity, only a short segment of the tape 100 is shown. The tape 100 may include a base material and a magnetic coating, although for simplicity the tape 100 is depicted as a single element.

The tape 100 includes a plurality of tracks 105. The track 105 may represent an area of the tape 100 where data is magnetically encoded. The data may be encoded by applying a magnetic field to a region of a track 105 to polarize the magnetic coating of the region. In one embodiment, the region may be polarized in one of two directions with each direction representing a binary value such as zero (0) and one (1).

One or more tracks 105 may be configured as data tracks such as second, third, fourth, fifth, and sixth tracks 105b-f. In addition, a track 105 such as a first track 105a may be configured to store a periodic sequence. The periodic sequence may be used to correctly position the read head over the data written in the data tracks 105b-f.

Figure 2:
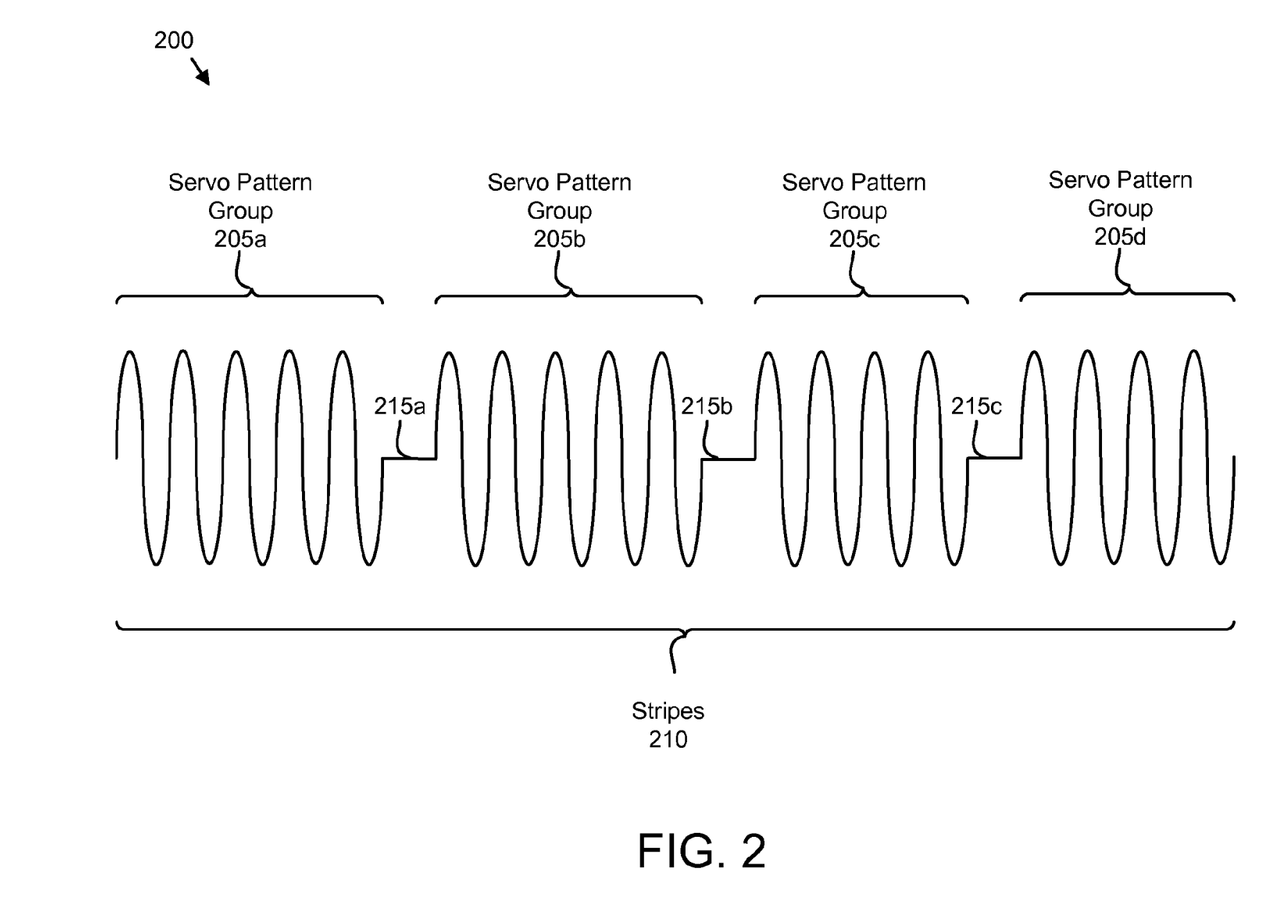
FIG. 2 is a schematic block diagram illustrating one embodiment of a periodic sequence of the present invention.

FIG. 2 is a schematic block diagram illustrating one embodiment of a periodic sequence 200 of the present invention. The periodic sequence 200 may be encoded in a track 105 of FIG. 1. In one embodiment, the periodic sequence 200 includes a plurality of servo pattern groups 205. The servo pattern groups 205 may be encoded as a polarization of a magnetic coating for a region of the tape 100 as described for FIG. 1. Each servo pattern group 205 may be delimited by an unpolarized interval 215. Alternatively, each servo pattern group 205 may occupy a fixed interval of the track 105.

Each servo pattern group 205 may comprise a specified number of stripes 210. In the depicted embodiment, each servo pattern group 205 includes either four (4) stripes of five (5) stripes 210. Thus a first and second servo pattern group 205a, 205b each represent the value five (5) while a third and fourth servo pattern group 205c, 205d each represent the value four (4).

The periodic sequence 200 comprises a sequence of servo pattern groups 205 that repeat. For example, the depicted periodic sequence 200 is configured as the sequence '5 5 4 4.' Thus a track 105 may comprise a plurality of servo pattern groups 205 with the values '. . . 5 5 4 4 5 5 4 4 5 5 4 4 . . . .'

Figure 3:
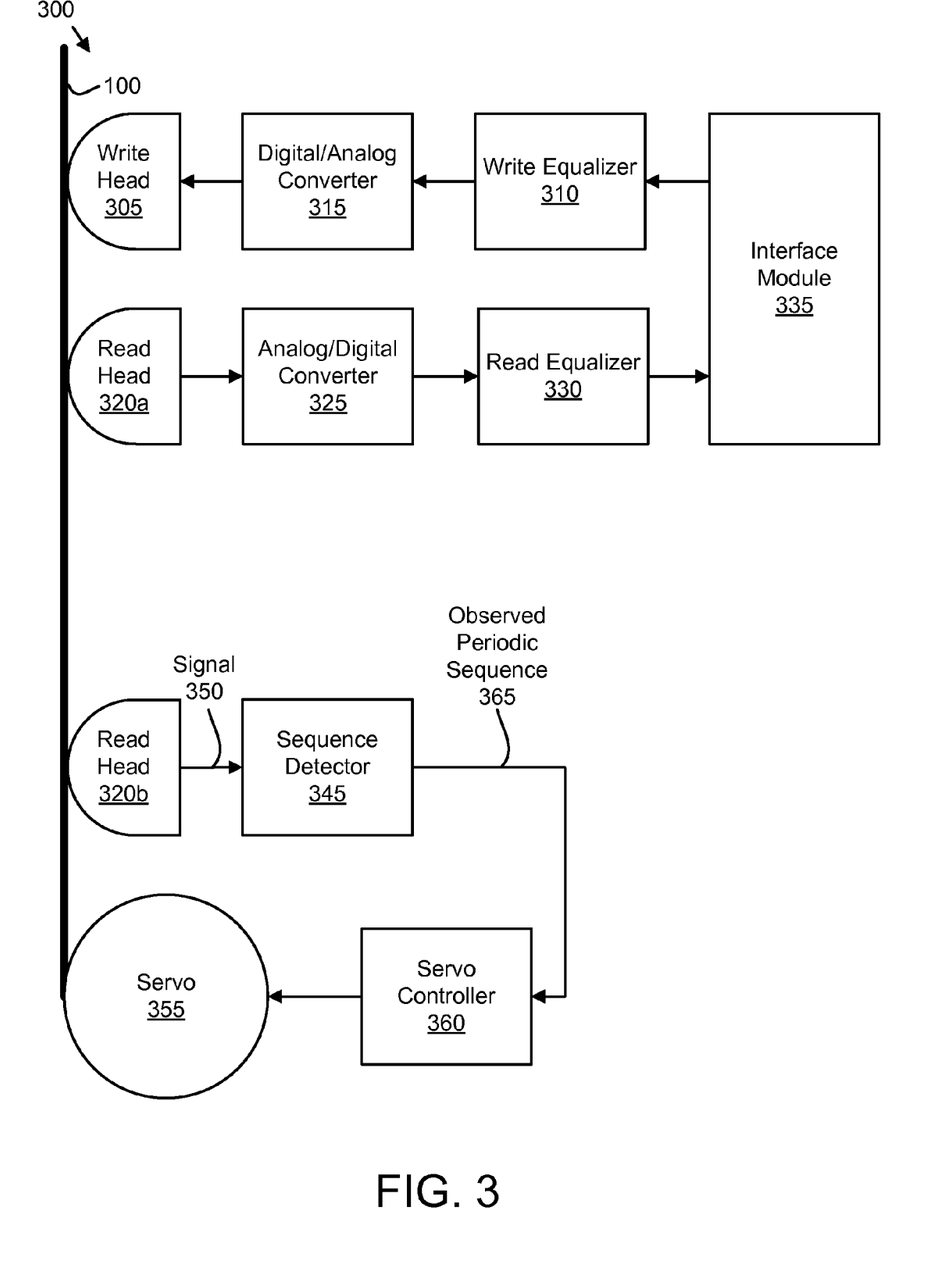
FIG. 3 is a schematic block diagram illustrating one embodiment of a read/write channel with servo of the present invention.

FIG. 3 is a schematic block diagram illustrating one embodiment of a read/write channel 300 with servo 355 of the present invention. The description of the read/write channel 300 refers to elements of FIGS. 1-2, like numbers referring to like elements. The read/write channel 300 includes a magnetic tape 100, a write head 305, a write equalizer 310, a digital/analog converter (DAC) 315, one or more read heads 320, an analog/digital converter (ADC) 325, a read equalizer 330, an interface module 335, a sequence detector 345, the servo 355, and a servo controller 360.

The servo 355 motivates the tape 100 under the control of the servo controller 360, positioning the tape 100 longitudinally relative the write head 305. The interface module 335 receives digital data such as data bits comprising a data block. The write equalizer 310 shapes the digital signal prior to conversion to an analog signal. The DAC 315 may convert the data into an analog signal as is well known to those skilled in the art. The write head 305 magnetically encodes the analog signal on a track 105 of the magnetic tape 100.

The periodic sequence is written to a track 105 of the magnetic tape 100 by the media manufacturer. The periodic sequence 200 may indicate the position of data encoded on the tracks 105 of the tape 100. When the tape 100 is read, a second read head 320b retrieves the magnetically encoded analog signal from the tape 100 as a signal 350. The sequence detector 345 detects the periodic sequence 200 from the signal 350 as will be described hereafter and communicates the periodic sequence 200 as an observed periodic sequence 365 to the servo controller 360. The servo controller 360 may employ the observed periodic sequence 365 in controlling the servo 355.

In a prophetic example, the servo controller 360 may direct the servo 355 to motivate the tape 100 so that the observed periodic sequence 365 progresses at a specified rate. Thus the servo controller 360 may speed or slow the servo 355 so that the servo pattern groups 205 of the periodic sequence 200 are detected at a specified rate. In a similar prophetic example, the servo controller 360 may direct the servo 355 to motivate the tape heads 305, 320a, 320b so that the observed periodic sequence 365 is correctly positioned relative to tape heads 305, 320a, 320b. Thus the servo controller 360 may move tape heads 305a, 320a, 320b to match lateral movement of the magnetic tape, thus keeping tape heads 305a, 320a centered on the designed read/write track location.

A first read head 320a retrieves the magnetically encoded analog signal from the tape 100 as an analog read signal. The ADC 325 converts the analog read signal into a digital representation of the analog read signal. The read equalizer 330 shapes the digital representation. In one embodiment, the interface module 335 may convert the digital representation into digital data as is well known to those skilled in the art. In one embodiment, the interface module 335 employs adaptive maximum likelihood detection to convert the digital representation into digital data. The interface module 335 may further employ the position information of the observed periodic sequence 365 to convert the digital representation into the digital data.

Figure 4:
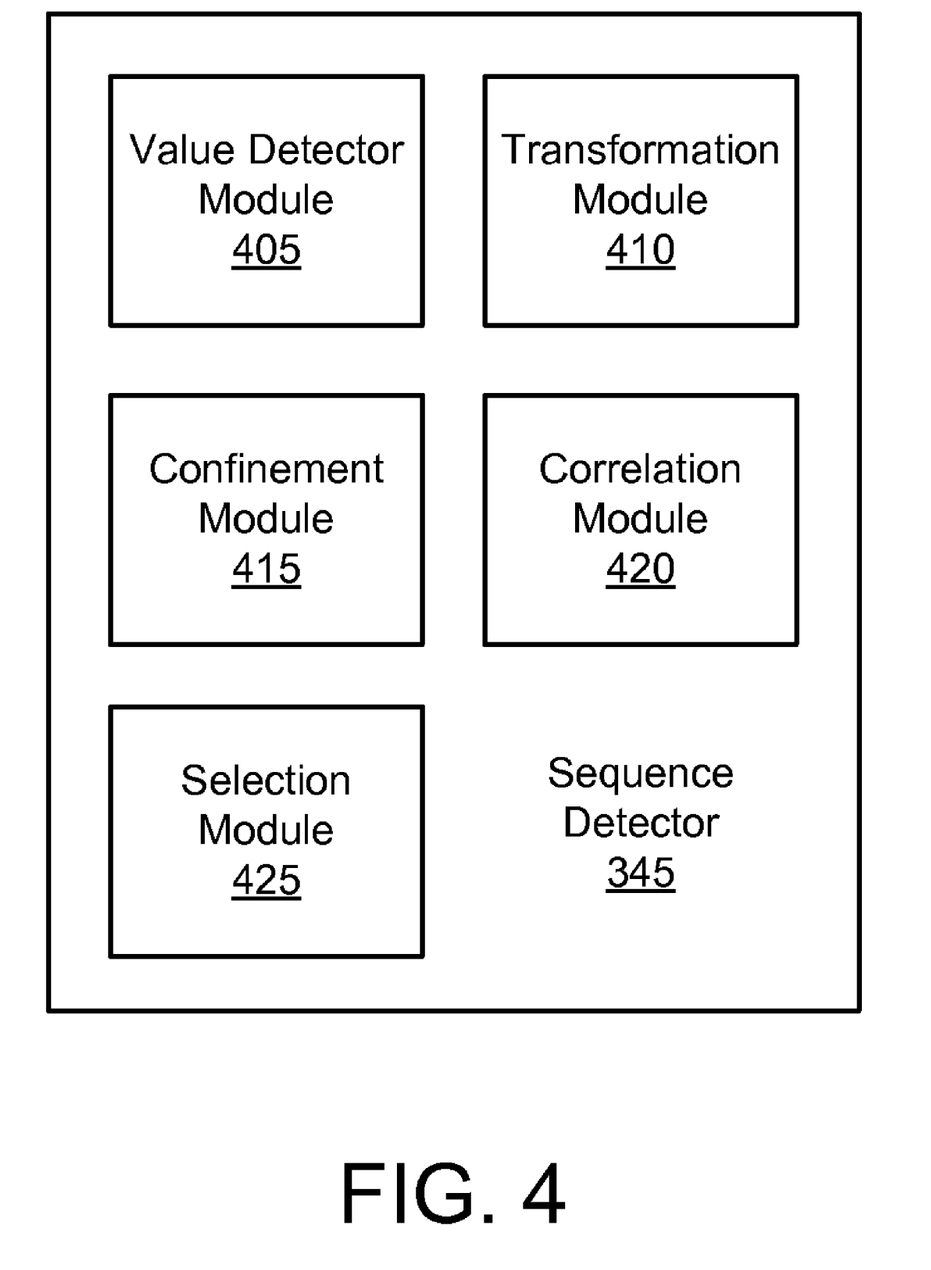
FIG. 4 is a schematic block diagram illustrating one embodiment of a sequence detector of the present invention.

FIG. 4 is a schematic block diagram illustrating one embodiment of a sequence detector 345 of the present invention. In one embodiment, the sequence detector 345 is the sequence detector 345 of FIG. 3. The description of the sequence detector 345 refers to elements of FIGS. 1-3, like numbers referring to like elements. The sequence detector 345 includes a value detector module 405, a transformation module 410, a confinement module 415, a correlation module 420, and a selection module 425. In one embodiment, the value detector module 405, transformation module 410, confinement module 415, correlation module 420, and selection module 425 are fabricated of a plurality of semiconductor gates as is well known to those of skill in the art.

The value detector module 405 detects a plurality of values of a periodic sequence 200. In one embodiment, the value detector module 405 counts the number of stripes 210 in a servo pattern group 205 and reports the number as a value.

In one embodiment, the transformation module 410 transforms the values into transformed values. The transformed values may be configured to simplify the correction of the periodic sequence. For example, the transformation module 410 may transform the periodic sequence 200 '5 5 4 4' into '1 1 −1 −1.' The transformation module 410 may transform the values by employing a mathematical equation as will be described hereafter.

The confinement module 415 confines the values and/or transformed values to a limited set of confined values as will be described hereafter. In one embodiment, the confinement module 415 may confine the values to two (2) confined values. Alternatively, the confinement module 415 may confine the values to three (3) values. Confining the values to the limited set of confined values improves the ability of the sequence detector 345 to detect the periodic sequence 200 when the periodic sequence 200 contains errors.

The correlation module 420 correlates the confined values with a plurality of instances of the periodic sequence 200 as will be described hereafter. In one embodiment, the correlation module 200 calculates a plurality of correlation values using a correlation equation comprising the confined values and one or more periodic sequence instances.

The selection module 425 selects an instance of the periodic sequence 200 with the highest correlation to the confined values as the observed periodic sequence 365 as will be described hereafter. In one embodiment, the selected observed periodic sequence 365 yields the largest correlation value from the correlation equation. The sequence detector 345 selects the observed periodic sequence 365 by confining the detected values to improve the correlation of the detected values to the periodic sequence 200.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
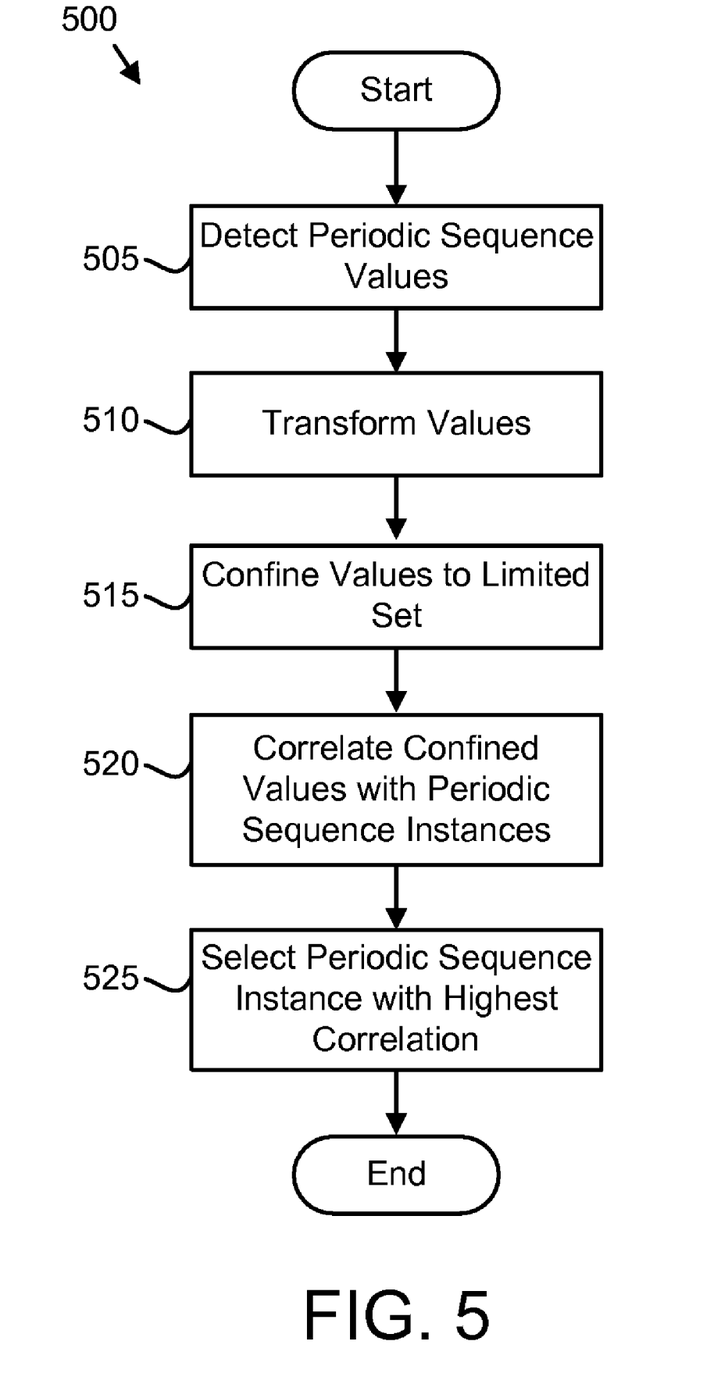
FIG. 5 is a schematic flow chart diagram illustrating one embodiment of a periodic sequence detection method of the present invention.

FIG. 5 is a schematic flow chart diagram illustrating one embodiment of a periodic sequence detection method 500 of the present invention. The method 500 substantially includes the steps to carry out the functions presented above with respect to the operation of the described apparatus 100, 400, periodic sequence 200, and system 300 of FIGS. 1-4. The description of the method 500 refers to elements of FIGS. 1-4, like numbers referring to like elements.

The method 500 begins, and in one embodiment, the value detector module 405 detects 505 values $u_k$ of a periodic sequence 200 where k denotes the current instance of the values u, k−1 denotes a previous instance of the values, k+1 denotes a subsequent instance of the values and so on as is well known to those skilled in the art. The periodic sequence 200 may repeat every p values. For example, the periodic sequence 200 may include the values u '5 5 4 4' as depicted in FIG. 2 where p equals four (4). The value detector module 405 may detect 505 the values $u_k$ from the signal 350.

In one embodiment, the value detector module 405 may store L instances of the detected periodic sequence 200, where L is also referred to as a window length. In one embodiment, L is greater than or equivalent to p. In a prophetic example, for the periodic sequence '5 5 4 4' the value detector module 405 may store ten (10) values such as the periodic sequence instance '5 5 4 4 5 5 4 4 5 5' for an L or window length of ten (10).

In one embodiment, the transformation module 410 transforms 510 the values $u_k$ into transformed values $r_k$. The transformed values $r_k$ may be symmetrical about a specified value such as zero (0). For example, the transformation module 410 may employ Equation 1 to transform 510 each value $u_k$ into the transformed value $r_k$.

$$r_k = 2u_k - 9 \qquad \text{Equation 1}$$

Continuing the example above, the transformation module 410 may employ Equation 1 to transform 510 the values $u_k$ '5 4 4 5 5 4 4 5 5' into the transformed values $r_k$ '1 1 −1 −1 1 1 −1 −1 1 1.' The transformed values $r_k$ are symmetric about zero (0).

The confinement module 415 confines 515 the values to a limited set of confined values $y_k$. In one embodiment, the values are the transformed values $r_k$. In an alternate embodiment, the values are the initial detected values $u_k$. The confinement module 415 may employ one or more confinement functions to confine 515 the values. Table 1 illustrates one embodiment of a confinement function for confining 515 values $u_k$ and/or transformed values $r_k$ as confined values $y_k$. The function yields a value from the $y_k$ column for each corresponding value from the $u_k/r_k$ column. Table 1 confines 515 the values $u_k$ and/or transformed values $r_k$ to two (2) specified values, a and b.

TABLE 1

| $u_k/r_k$ | $y_k$ |
|---|---|
| ≧a | a |
| ≦b | b |

Table 2 illustrates an alternate embodiment of a confinement function. As shown, Table 2 confines 515 the values $u_k$ and/or transformed values $r_k$ to three (3) specified values, a, b and c.

TABLE 2

| $u_k/r_k$ | $y_k$ |
|---|---|
| a | a |
| b | b |
| Any other value | c |

Continuing the example above where the periodic sequence is '5 5 4 4' and the transformed periodic sequence is '1 1 −1 −1,' a and b of Tables 1 and 2 respectively may be +1 and −1. Thus two embodiments of the confinement functions of Tables 1 and 2 for the transformed periodic sequence '1 1 −1 −1' and a transformed value input $r_k$ is shown in Tables 3 and 4 where a is one (1), b is minus one (−1), and c is zero (0).

TABLE 3

| $r_k$ | $y_k$ |
|---|---|
| ≧+1 | +1 |
| ≦−1 | −1 |

TABLE 4

| $r_k$ | $y_k$ |
|---|---|
| +1 | +1 |
| −1 | −1 |
| Any other value | 0 |

The correlation module 420 correlates 520 the confined values $y_k$ with a plurality of instances of the periodic sequence x 200. The periodic sequence instances $x^{(i)}$ may represent each possible instance of the periodic sequence 200 with p values. Continuing the example above for the transformed periodic sequence '1 1 −1 −1,' with p=4 the periodic sequence instances $x^{(j)}$, j=0, 1, . . . , p−1, for an L of ten (10) may be $x^{(0)}$='1 1 −1 −1 1 1 −1 −1 1 1,' $x^{(1)}$='1 −1 −1 1 1 −1 −1 1 1 1 −1,' $x^{(2)}$='−1 −1 1 1 −1 −1 1 1 −1 −1,' $x^{(3)}$='−1 1 1 −1 −1 1 1

−1 −1 1.' In one embodiment, the correlation module 420 correlates 515 the confined values $y_k$ with a plurality of instances of the periodic sequence x by calculating a correlation value C(j) for each value of j from 0 to p−1. In a certain embodiment, the correlation module 420 employs Equation 2 to calculate p correlation values C(j), j=0, 1, ..., p−1, where $x_i$ is the i-th instance in periodic sequence x.

$$C(j) = \sum_{i=0}^{L-1} y_{k-i} - x_{L-1-i+j} \quad \text{Equation 2}$$

The selection module 425 selects 525 a periodic sequence instance with the highest correlation to confined values $y_k$ as the observer periodic sequence 365. In one embodiment, the selection module 425 selects 525 the periodic sequence instance $x^{(j)}$ for the greatest correlation value C(j) as illustrated by Equation 3.

$$x^{(j)} \text{ for max}(C(j)) \quad \text{Equation 3}$$

where $x^{(0)}$='$x_0 x_1 \ldots x_{L-1}$,' $x^{(1)}$='$x_1 x_2 \ldots x_L$', ..., $x^{(p-1)}$='$x_{p-1} x_p \ldots x_{L+p-2}$'.

The observed periodic sequence 365 may be output as a corrected instance of the detected values $u_k$ and the method 500 terminates. The method 500 tolerates errors in the values $u_k$ by correcting the errors. In one embodiment, the method 600 may tolerate n errors, where n is specified by Equation 4, and the floor function floor(z) yields the largest integer less than or equal to z. For example, floor(2.25) is equal to 2.

$$n = \text{floor}\left(\frac{L-M-1}{4}\right) \quad \text{Equation 4}$$

The value M may be calculated as the maximum of a plurality of autocorrelation functions R(j) as shown in Equation 5.

$$M = \max(R(j), j \neq 0) \quad \text{Equation 5}$$

In one embodiment the autocorrelation functions R(j) are calculated using Equation 6.

$$R(j) = \sum_{k=0}^{L-1} x_k x_{k+j} \quad \text{Equation 6}$$

The method 500 detects the observed periodic sequence 365 although the values of the periodic sequence 200 may include errors. In one embodiment, the method 500 may correct up to n errors for a window length of L where n is calculated using Equations 4, 5, and 6.

Figure 6:
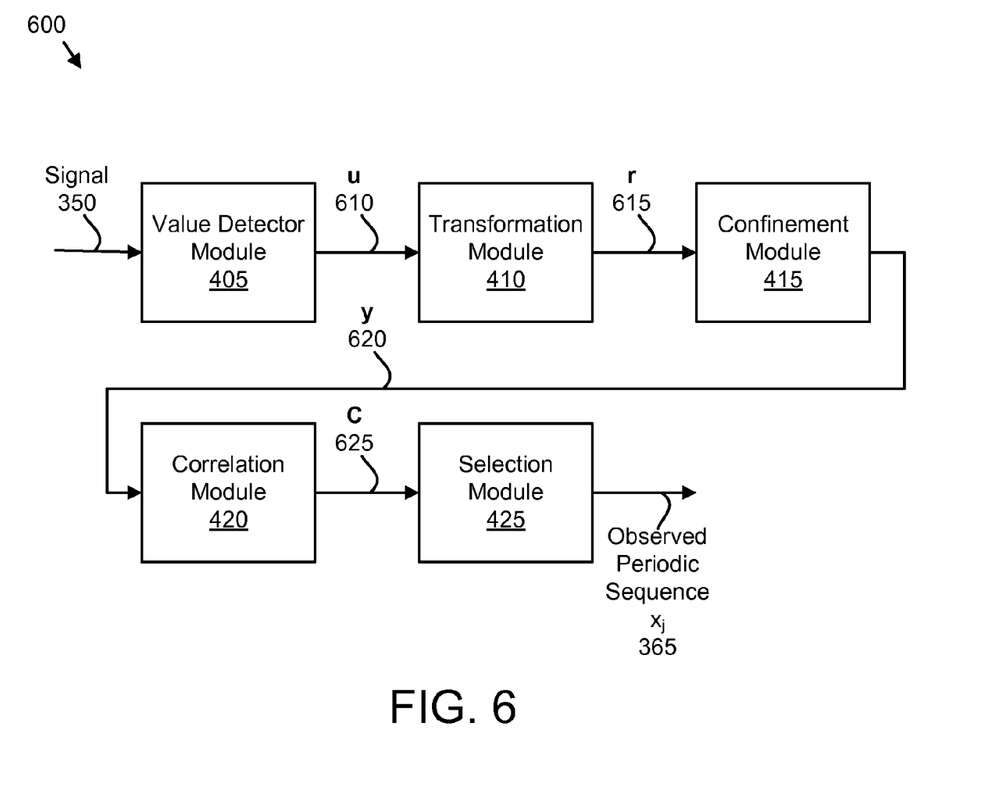
FIG. 6 is a schematic block diagram illustrating one embodiment of a periodic sequence detection process of the present invention.

FIG. 6 is a schematic block diagram illustrating one embodiment of a periodic sequence detection process 600 of the present invention. The process 600 illustrates the steps and data elements of the method 500 of FIG. 5. The description of the process 600 refers to elements of FIGS. 1-5, like numbers referring to like elements.

The value detector module 405 receives the signal 350. The signal 350 may be generated by a read head 320 such as the second read head 320b. In addition, the signal 350 may comprise a plurality of stripes 210 that embody the periodic sequence 200. The value detector module 405 detects 505 a plurality of values u 610 of the periodic sequence 200. In a prophetic example, the value detector module 405 detects 505 the values '4 4 4 5 6 4 4 5 5 4.' The value detector module 405 may store the ten (10) values where the window length L is ten (10).

In one embodiment, the transformation module 410 transforms 510 the values u 610 into transformed values r 615. Continuing the prophetic example, the transformation module 410 may transform 510 the values '4 4 4 5 6 4 4 5 5 4' into the transformed values '−1 −1 −1 1 3 −1 −1 1 1 −1' using Equation 1.

The confinement module 415 confines 515 the values r 615 to a limited set of confined values y 620. Continuing the prophetic example above, the confinement module 415 may confine 515 the transformed values '−1 −1 −1 1 3 −1 −1 1 1 −1' using the function of Table 3 into the confined values '−1 −1 −1 1 1 −1 −1 1 1 −1'

The correlation module 420 correlates 520 the confined values y with a plurality of instances of the periodic sequence x 200. Continuing the prophetic example above, the correlation module 420 may calculate a plurality of correlation values C 625 using Equation 2, where L is ten (10), y is '−1 −1 −1 1 1 −1 −1 1 1 −1', and $x^{(0)}$ is '1 1 −1 −1 1 1 −1 −1 1 1' as illustrated in Equations 7.

$$C(j) = \sum_{i=0}^{9} y_{k-i} - x_{L-1-i+j} \quad \text{Equation 7}$$

The correlation module 420 may calculate the correlation value C(j) for each j from zero (0) to p−1. In the prophetic example, p is equal to four (4) so the correlation module 420 calculates four (4) correlation values C(0), C(1), C(2), and C(3) as shown in Equations 8, 9, 10, and 11.

$$\begin{aligned}C(0) &= (-1*1) + (-1*1) + (-1*-1) + (1*-1) + \\ &\quad (1*1) + (-1*1) + (-1*-1) + (1*-1) + \\ &\quad (1*1) + (-1*1) \\ &= -1 - 1 + 1 - 1 + 1 - 1 + 1 - 1 + 1 - 1 \\ &= -2\end{aligned} \quad \text{Equation 8}$$

$$\begin{aligned}C(1) &= (-1*1) + (-1*-1) + (-1*-1) + (1*1) + \\ &\quad (1*1) + (-1*-1) + (-1*-1) + (1*1) + \\ &\quad (1*1) + (-1*-1) \\ &= -1 + 1 + 1 + 1 + 1 + 1 + 1 + 1 + 1 + 1 \\ &= 8\end{aligned} \quad \text{Equation 9}$$

$$\begin{aligned}C(2) &= (-1*-1) + (-1*-1) + (-1*1) + (1*1) + \\ &\quad (1*-1) + (-1*-1) + (-1*1) + (1*1) + \\ &\quad (1*-1) + (-1*-1) \\ &= 1 + 1 - 1 + 1 - 1 + 1 - 1 + 1 - 1 + 1 \\ &= 2\end{aligned} \quad \text{Equation 10}$$

$$\begin{aligned}C(3) &= (-1*-1) + (-1*1) + (-1*1) + (1*-1) + \\ &\quad (1*-1) + (-1*1) + (-1*1) + (1*-1) + \\ &\quad (1*-1) + (-1*1) \\ &= 1 - 1 - 1 - 1 - 1 - 1 - 1 - 1 - 1 - 1 \\ &= -8\end{aligned} \quad \text{Equation 11}$$

The selection module 425 selects 525 an instance of the periodic sequence 200 with the highest correlation to the confined values y 620 as the observed periodic sequence 365. In one embodiment, the selection module 425 selects 525 the instance x corresponding to the maximum correlation value C 625 using Equation 3. Continuing the prophetic example above, the selection module 425 selects 525 the periodic sequence instance $x^{(1)}$ '1 −1 −1 1 1 −1 −1 1 1 −1' as the observed periodic sequence 365.

The embodiment of the present invention detects a periodic sequence 200 from a plurality of values 620 by confining 515 the values 610 to a limited set of confined values 620. In addition, the embodiment of the present invention may improve the detection of the periodic sequence 200 when the values 610 include one or more errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect a periodic sequence, the apparatus comprising:
    a value detector module configured to detect a plurality of values of a periodic sequence of servo signals;
    a confinement module configured to confine the plurality of values to a limited set of confined values;
    a correlation module configured to correlate the confined values with a plurality of instances of the periodic sequence; and
    a selection module configured to select an instance of the periodic sequence with the highest correlation to the confined values as an observed periodic sequence.

2. The apparatus of claim 1, wherein the confinement module is further configured to confine each value of the plurality of values to a first confined value in response to the value being greater than or substantially equivalent to the first confined value and confine the value to a second confined value in response to the value being less than or substantially equivalent to the second confined value.

3. The apparatus of claim 2, wherein the first confined value is one and the second confined value is negative one.

4. The apparatus of claim 1, wherein the confinement module is further configured to confine each value of the plurality of values to a first confined value in response to the value being substantially equivalent to the first confined value, confine each value to a second confined value in response to the value being substantially equivalent to the second confined value, and confine each value to a third confined value in response to the value not being substantially equivalent to both the first and second confined value.

5. The apparatus of claim 4, wherein the first confined value is one, the second confined value is negative one, and the third confined value is zero.

6. The apparatus of claim 1, wherein the correlation module is further configured to correlate the confined values with the plurality of instances of the periodic sequence by calculating a plurality of correlation values.

7. The apparatus of claim 6, wherein the correlation module is configured to calculate the plurality of correlation values C(j) using the equation $$C(j) = \sum_{i=0}^{L-1} y_{k-i} - x_{L-1-i+j}$$

where L is a number of stored values, k indicates a current instance of the values, j is an integer from 0 to p−1, p is a number of values in the periodic sequence, $y_{k-i}$ is a previous confined value instance, and each x is a periodic sequence instance of the plurality of instances of the periodic sequence, and where the selected instance of the periodic sequence has the maximum correlation value.

8. The apparatus of claim 1, further comprising a transformation module configured to transform the plurality of values into transformed values and wherein the confinement module confines the transformed values to generate the confined values.

* * * * *